US011882633B2

(12) United States Patent
Muehlschlegel et al.

(10) Patent No.: US 11,882,633 B2
(45) Date of Patent: Jan. 23, 2024

(54) REGULATING METHOD FOR CONTINUOUS AND PULSED OUTPUT VARIABLES AND ASSOCIATED CIRCUIT ARRANGEMENT

(71) Applicant: OSRAM GmbH, Munich (DE)

(72) Inventors: Joachim Muehlschlegel, Groebenzell (DE); Markus Heckmann, Munich (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 18/064,938

(22) Filed: Dec. 13, 2022

(65) Prior Publication Data

US 2023/0232514 A1 Jul. 20, 2023

(51) Int. Cl.
*H05B 45/37* (2020.01)

(52) U.S. Cl.
CPC .................................... *H05B 45/37* (2020.01)

(58) Field of Classification Search
CPC ....................................................... H05B 45/37
See application file for complete search history.

(56) References Cited

U.S. PATENT DOCUMENTS

| | | | | |
|---|---|---|---|---|
| 8,198,832 | B2 | 6/2012 | Bai et al. | |
| 10,715,153 | B1 * | 7/2020 | Bekele | H03B 5/1228 |
| 10,903,862 | B2 * | 1/2021 | Kranz | H03F 1/083 |
| 2005/0134188 | A1 | 6/2005 | Lindqvist | |
| 2011/0204861 | A1 * | 8/2011 | Tyrrell | H02M 3/07 323/282 |
| 2011/0221357 | A1 | 9/2011 | Braun et al. | |
| 2019/0357327 | A1 | 11/2019 | Heckmann | |
| 2020/0251988 | A1 * | 8/2020 | Yamada | H02M 3/156 |

FOREIGN PATENT DOCUMENTS

| | | | |
|---|---|---|---|
| DE | 19848925 | A1 | 4/2000 |
| DE | 102004010942 | B3 | 10/2005 |
| DE | 102017204907 | A1 | 9/2018 |
| EP | 1689212 | A1 | 8/2006 |
| EP | 2340690 | A1 | 7/2011 |
| WO | 2005062674 | A1 | 7/2005 |
| WO | 2018114528 | A1 | 6/2018 |
| WO | 2018114533 | A1 | 6/2018 |

OTHER PUBLICATIONS

German Search Report issued for the corresponding DE patent application No. 10 2022 200 430.2, dated Sep. 9, 2022, 4 pages (For informational purposes only).

* cited by examiner

*Primary Examiner* — Minh D A
(74) *Attorney, Agent, or Firm* — VIERING, JENTSCHURA & PARTNER mbB

(57) ABSTRACT

A method for operating clocked and regulated electronic power converters may be contained in operating devices for light-emitting diodes. An associated regulating circuit may include at least one regulating amplifier having at least two regulating inputs, from the output of which a negative feedback network runs to one of its regulating inputs, a first input for the signal for a target value of the average of the output power to be regulated, and a second input which forwards a signal for the target value of a waveform or of a pulse pattern for the output power to be regulated to one of the regulating inputs via a DC current-blocking high-pass filter.

18 Claims, 5 Drawing Sheets

REGULATING METHOD FOR CONTINUOUS AND PULSED OUTPUT VARIABLES AND ASSOCIATED CIRCUIT ARRANGEMENT

CROSS-REFERENCE TO RELATED APPLICATION

The present patent application claims priority, according to 35 U.S.C. § 119, from German Patent Application No. 10 2022 200 430.2 filed on Jan. 17, 2022, which is incorporated herein by reference in its entirety and for all purposes.

TECHNICAL FIELD

A method and an associated regulating circuit for an electronic power converter are specified in order to be able to provide either continuous or pulsed electrical variables or both at the output of this converter. In this case, the electronic power converter may be an operating device for light-emitting diodes. The pulsed variables particularly advantageously arise at a low brightness of the light-emitting diodes, in which case the current thereof is intended to be able to be output in a pulsed manner. The same method can also be used to implement periodic mode changeovers within such a power converter or operating device.

BACKGROUND

It is known from practice that power light-emitting diodes for general lighting technology often have a color drift depending on their current and a highly fluctuating efficiency, in particular in the case of weak cooling, likewise depending on their current. The latter may allow control loops, which control via a light or brightness measurement, to become even paradoxical or unstable. In order to avoid both, but to nevertheless be able to control the brightness of the light-emitting diodes, the current through the light-emitting diodes is often left at the 100% level, but is accordingly pulse-width-modulated in order to reduce the brightness.

This method entails very short current pulses for low brightnesses and therefore the risk of flicker and/or stroboscopic effects. Furthermore, an electronic power converter suitable for this purpose must allow very short pulses at its output, must be able to switch very high signal edges very quickly, but must always provide its nominal current. EP-1-689-212-A1, for example, therefore proposes, inter alia, no longer further reducing the duty ratio of the pulse width modulation as of a particular brightness in order to further reduce the brightness, but rather to keep it constant and instead to reduce the current level within the pulses.

Said color drift has become smaller and smaller over the course of time, and pulse-width-modulated lighting systems produce great problems with film and television recordings. Therefore, it has become standard in the meantime to reduce the brightness of light-emitting diodes by continuously reducing their current and often no longer carrying out any pulse width modulation at all. The residual ripple of the light-emitting diode current is increasingly becoming a quality feature in corresponding lighting systems. However, in the case of very low brightnesses—apart from accuracy problems when regulating an electronic power converter provided for this purpose—another effect comes to light, which is produced from otherwise irrelevant defects in the crystal of the light-emitting diodes: each individual light-emitting diode has a slightly differing minimum current for which light is actually produced. If a larger number of light-emitting diodes are dimmed down to a very great extent at the same time, some light-emitting diodes become completely dark first and perhaps a single light-emitting diode emits light until the end. The optical appearance of a light installation equipped with a large number of light-emitting diodes and operated in this manner suffers greatly from this.

This effect can be eliminated by deliberately making the light-emitting diode current more rippled again in the case of very low brightnesses, for example below 5% of the nominal brightness. As a result, all light-emitting diodes involved in the same light installation emit light of approximately the same brightness, but in a micro-pulsed manner as it were, and further dimming takes place, as above, by reducing a duty ratio which is smoothed by the eye into a continuously reducing brightness. On account of the edge heights which are significantly lower than those above, the frequency of the micro-pulses may be considerably higher, for example above 1 kHz or above 10 kHz, in order to reliably avoid any stroboscopic effects, or even particularly advantageously at the clock frequency of the electronic power converter supplying the light-emitting diodes in question. The latter is proposed in the three applications DE-10-2017-204-907-A1, WO-2018-114528-A1 and WO-2018-114533-A1. At the lower end of the brightness scale, the stated regulation for continuous and pulsed output variables and the associated circuit also have an effect. They simplify the outlay considerably, in particular in the field of the hardware of the at least one clocked power stage of the electronic power converter and in the case of the software for a control IC therefor. If the power converter in question is intended to be controlled in an analog manner via a discrete small signal circuit, the latter is likewise considerably simpler than without using the proposed regulation together with the associated circuit.

In order to be able to subject the output of an electronic power converter to pulse width modulation, there have hitherto been two methods. Either an additional electronic power switch is installed in the converter in series with the possible output current and is controlled according to pulse width modulation which is provided for this purpose and is also called PWM below. During the high levels of this PWM, said additional switch is completely turned on, that is to say conductive with minimal possible losses, and is completely turned off during the low levels of the same PWM. In the case of inverse logic, this assignment applies exactly conversely. The frequency of this PWM is typically between 1 kHz and 10 kHz. This includes a duty ratio or duty cycle in each case. Both together are also referred to as a pulse pattern below, in which case only one possible waveform of this pulse pattern is described thereby, namely a rectangular waveform.

Alternatively, the control of the at least one clocked power transistor in the electronic power converter is periodically interrupted, with the result that the converter does not transmit any power during the PWM low levels and does transmit power during the PWM high levels. In this case, the above additional power switch is dispensed with. The prerequisite for this is that the edge steepness at the output is unimportant and/or that the electronic power converter as such is relatively quick.

Both methods have the disadvantage that the control loop which is actually provided for regulating an output variable of the electronic power converter in question and is usually optimized in terms of repetition accuracy, resolution and constancy of the variable to be regulated by it is periodically interrupted. This results firstly in this control loop having to stabilize again each time, that is to say at least a thousand times per second, and secondly in it measuring incorrectly. As a result of the disconnection which is periodically enforced from the outside, less of the variable is measured than would be produced by the same output signal from the same regulator without PWM thereof. The regulator therefore tricks the PWM by counteracting a power reduction actually desired by an output PWM. Therefore, its target value must be corrected by the duty ratio of the PWM. However, the regulation is then still very inaccurate because the above stabilization processes periodically occur and, as a result, can lead not only to a likewise periodic ripple of the output variable but also, owing to the many in-phase overshoots, to offset errors and even complete instability if the natural frequency of the control loop is similar to the frequency of the PWM or corresponds thereto.

A further method for preventing a regulator from tricking a PWM that is externally imposed from its point of view is to "freeze" all regulation state variables at the beginning of each turn-off period and to rerelease them at the beginning of each turn-on period, which can advantageously be achieved only digitally. This is described, by way of example, in EP-2-340-690-B1 were even two such regulators operate in alternation. The load there, a high-pressure discharge lamp, is intended to be operated with rectangular-waveform current, wherein the instantaneous power must be the same in both directions in each case. However, depending on the current direction, this lamp forms slightly different running voltages, which results in again slightly different lamp currents for each direction. Instead of allowing a central power regulator to stabilize to a lower running voltage and consequently a higher lamp current or vice versa each time, two power regulators are provided, one for a positive running voltage and a positive lamp current, and a second for a negative running voltage and a negative lamp current. Depending on the phase of the lamp, both regulators operate alternately, in which case said "freeze/release" method is used on both sides. Only an identical target power for both phases or for both regulators is centrally specified, and this target value is changed only slowly, thus ensuring global stability for the entire system. In this manner, the clocked electronic power converter, a full bridge having four active power transistors, could suddenly change its output current, even though the target value responsible for this is consistent. This effectively prevents the spontaneous turning-off of small high-pressure lamps (20 W, 35 W) when their current direction changes.

In contrast, for LED operation, it is advantageous to not entirely drive the output signal to zero during the PWM low levels, but rather to keep it at a residual value, the so-called simmer level. Both of the above methods, additional power switch in series with the output or interruption in the control of the at least one power transistor, do not provide this in principle. In particular, in the case of voltages as a regulated output variable of an electronic power converter in question as an LED operating device, this simmer level may be more than 80% of the nominal variable. In the case of currents to which a converter output is intended to be regulated, the simmer level is typically 5% to 10% of that output variable which is present during the PWM high levels, or depends on the present duty ratio. Ultimately, it is intended to be even possible to modify the regulated output variable "current" or "voltage" by means of any desired periodic curve shapes or waveforms.

One objective is to specify a method and an associated circuit for regulating an electronic power converter, which, while avoiding the two problems just described and while maintaining the possibility of a simmer level, allow at least one output variable of the power converter in question to also be output in a pulsed or otherwise periodically modified manner. The pulse pattern required for this, that is to say the frequency and duty ratio of a pulse width modulation or PWM for example, is intended to be able to be externally specified or internally generated in a controller superordinate to the regulating means of the power converter in question.

SUMMARY

In accordance with the method, a regulated and clocked electronic power converter, the control loop of which is optimized for continuous output variables of the same converter, can also be used to generate at least one pulsed or otherwise periodically modified output variable which thereby receives a waveform. For this purpose, the clocked power converter comprises an input for inputting an electrical input power and an output for outputting one or more regulated electrical output variables. Depending on the character of the electrical load connected to the output, this is either an output voltage or an output current. However, since only the power output can be varied inside the clocked power converter, the regulated output variable may also be the output power, which includes both of the output variables just mentioned. During the modification, neither the physical power flow at the output of the power converter in question is periodically interrupted nor the control, in particular clocking, of the same power converter as such, but rather the target value of its control loop is modified substantially with the same pulse form or waveform, which form the periodically modified desired output power is intended to have. This pulse pattern or this waveform can be input, independently of a first target value which specifies a continuous output power, as a second target value to the regulating means which has at least two inputs that are separate from one another for this purpose. The first target value for a continuous output power is always input to the first input. For the modification, the at least two target values are added to form a sum target value which is input to the control loop. In this case, the sum target value is modified with the waveform in such a manner that the average of the sum target value corresponds to the first target value for a continuous output power. The continuous output power specified by the first target value corresponds exactly in this case to the temporal average of the output variable modified with a pulse pattern. The entire control loop, the sum target value of which is modified, that is to say measurement, negative feedback or compensation, regulation, control and actual electrical power conversion, is engaged permanently and dynamically without change.

As a result, the control loop remains adjusted and need not stabilize again before or after each pulse. If the negative feedback of the control loop, also called compensation or feedback, also contains a dominant integrating component, the temporal average of the regulated output power remains constant and corresponds to the first target value irrespective of which pulse form or waveform the output power is intended to assume and also irrespective of whether a waveform or a continuum of the same output power is actually desired, that is to say irrespective of whether or not a second—undulating—target value is input. This is because filters may also be integrated in each regulating network. The required averaging for the measurement signal of the at least one pulsed output variable requires, for example, a low-pass filter, the capacitor of which can also be connected to the similarly low-impedance output of a regulating amplifier, instead of being connected to ground. In this manner, the measurement signal is likewise filtered, but the entire control loop is one dynamic stage simpler (and therefore able to be better stabilized) because there are not two mutually independent capacitors—filter capacitor and negative feedback capacitor—but rather only the negative feedback capacitor which likewise undertakes both tasks. This makes it possible to use the color drift of colored light-emitting diodes, in particular light-emitting diodes emitting primary beams, which are provided for general lighting technology, without influencing the brightness in the process. The color drift is present without a second target value and is reduced with a second target value.

According to the above understanding, a pulse pattern is therefore a specially distinctive waveform in which the pulses all have the same level (that is to say the same voltage for example), whereas they may have different levels in the case of a waveform. A pulse pattern is therefore a special case of a waveform. A waveform is generally any form of an electrical variable which is not uniform. However, a simple sinusoidal oscillation is generally not considered to be a waveform, but rather more complex higher-order waveforms with different levels of the successive minima and maxima which occur at different intervals of time. In contrast, a classic example of a pulse pattern would be the signal from a pulse width modulation with a particular duty ratio.

According to the method, the control loop comprises at least two inputs, and the second target value may be input to the control loop, for the desired pulse form or waveform of the output power to be regulated in a modified manner, at a second input of the control loop, particularly advantageously in the form of a voltage, a current, an integral of a voltage or an integral of a current. The first target value, which specifies the value of an output power to be regulated to be continuous or specifies the average of an output power to be regulated to be modified, is likewise advantageously input at a first input of the control loop in the form of a voltage or a current and independently of the second target value.

According to the method, the power converter in question outputs a continuous output power if a second target value for a waveform is not input at all to its regulating means. The value of the continuous output power is then regulated precisely to the input first target value for the temporal average. It is therefore obligatory to input a first target value for this average to the regulating means.

In one particularly advantageous embodiment of the method, the second target value has temporal minima which differ from the average of its waveform by a magnitude which is smaller than the magnitude of the first target value, such as 80% to 98% of said magnitude, or 90% to 96% of said magnitude. This results in minimum values of greater than zero, so-called simmer levels, which are 20% to 2% of the average output power, particularly advantageously 10% to 4% thereof, in the sum target value and substantially also in the output power regulated in an undulating manner. This makes it possible to considerably reduce a stroboscopic effect in light-emitting diodes which are provided for general lighting technology. Furthermore, periodic mode changes of the clocked power converter (operation-no operation-operation etc.) are avoided as a result, and the active regulator of the control loop can be supplied in a simplified manner, in particular in a single-pole manner, because both the manipulated variable at its output and all target values are always positive and, although approaching a zero line, never reach it.

A very common embodiment of the method, which is therefore to be strived for in particular, states that the waveform is substantially rectangular and is therefore a pulse pattern, that the second target value is a target value for the pulse pattern, and that the edge heights of the regulated output power depend on the edge heights of the second target value. Such pulsed target values can be generated most easily, for example digitally, and their effects in a clocked electronic power converter can be calculated particularly accurately on account of the "state space averaging" that can be used there and can therefore be planned particularly well.

In another embodiment of the method, the edge heights of the regulated output power may depend on the average of this regulated output power and on a duty ratio of the pulse pattern. In particular, the method also involves the values of the output power to be output in an undulating or pulsed manner being increased in a manner proportional to the complement of the duty ratio of the desired pulse pattern starting from an average, while a target value for the pulse pattern has a higher level, and being reduced in a manner proportional to the same duty ratio starting from the same average, while a target value for the pulse pattern has a lower level. The assignment between the levels of the pulse pattern target value and the increase or reduction in the values of the pulsed output power can also be swapped exactly with respect to the above. In this manner, the method also allows a simmer level of the output power between its pulses in contrast to conventional PWM in which a zero level generally prevails between the pulses.

Alternatively, the method involves the edge heights of both the second target value and the resulting output power each being constant. The method therefore comprises at least one first region, in which the output power is desired as a continuous output variable, and at the same time a second region in which the output power is desired as an output variable periodically modified in a specified waveform. In most cases, the temporal averages of the output power are smaller in the second region than in the first region, where the average simultaneously corresponds to the continuous value of the output power. The value of the output power on that side of an interface between these two regions which faces the first region, reduced by a desired simmer level and divided by a duty ratio desired on that side of the same interface which faces the second region, defines the edge height. In this second region, the average of the output power is reduced in the case of a constant edge height by reducing the duty ratio.

In order to keep stroboscopic effects under control, not only in terms of amplitude but also in terms of frequency, in the region illuminated by the light-emitting diodes which are operated according to the stated method, the frequency of the waveform or the pulse form is, for example, between 500 Hz and 10 kHz, such as in a range between 1 kHz and 5 kHz.

Particularly advantageously, the output current of the electronic power converter is substantially regulated using the regulated output power in accordance with the stated method. This may form the core of an operating device for light-emitting diodes which are provided for general lighting technology and are intended to be operated according to the method. The operating device is therefore configured for use of the method. Since, owing to the light-emitting diodes as the load, the output voltage thereof is given, constant and impressed, the output current is also automatically regulated by regulating the output power, and vice versa. This is because only the output current is usually actually measured and its measured value is reported back and is used as an actual value. The output power is produced from the output current by means of multiplication by the constant factor "output voltage".

The circuit associated with the method for positive logic of the regulating section, that is to say for a positive regulating direction, has at least one regulating operational amplifier or regulating amplifier, from the output of which a compensation or negative feedback network, which comprises a negative feedback resistor, runs to the negative regulating input thereof. The measurement signal of the output variable to be regulated is also connected to the same negative regulating input via a second series impedance which, together with the negative feedback resistor, produces a proportional gain of the regulating amplifier that suffices for a highest intended edge height of the desired pulse pattern. The signal for the target value of the average of the at least one output variable to be regulated is guided to the positive input of the same operational amplifier, that is to say to the positive regulating input, via a first series impedance which, for the purpose of impedance matching, which helps against offset and drift errors of the operational or regulating amplifier, may have approximately the same value as the impedance in series with the other regulating input, that is to say the second series impedance at the negative regulating input here. A first target value input for the control loop is therefore defined. Depending on the regulating direction, the ranges of values or the orientation of the input variables, the above assignment of the target signal and measurement signal to the positive and negative regulating inputs may be swapped. The compensation may also end at the positive regulating input of the operational amplifier, or both may occur at the same time.

The circuit associated with the method also comprises a second target value input for the pulse pattern or generally for the waveform. This is forwarded, purely capacitively, either to the positive or to the negative regulating input of the regulating amplifier, that is to say at least one series capacitor is connected downstream of the second target value input. As a result, the temporal averages neither of the target value signal nor of the measured value signal are distorted. For this purpose, the second target value input comprises at least one series capacitor, that is to say has the form and function of a DC current-blocking high-pass filter.

The circuit arrangement for the control loop can be particularly advantageously disconnected and coupled again at the above series capacitor. The second target value may be produced in a special circuit module which can be optionally connected to the second input and can be disconnected from it. This modular design becomes possible as a result of the obligatory input of the first target value and the only optional input of the second target value. A standard circuit arrangement without a special circuit module can regulate only continuous output powers or output currents, and only the coupling of a special circuit module makes it possible to regulate a pulsed or otherwise periodically modified output power. Various ASICs or FPGAs can be plugged into the same socket, one without and one with the logic part for generating a pulse pattern. Alternatively, there may be two different program versions for the microcontroller or for the regulating IC, one without and one with an option for periodic modification.

Said compensation branch particularly advantageously comprises at least one integrating capacitor in series with the negative feedback resistor. This structure generates the above-mentioned dominant integrating component of the regulating gain. As a result, the temporal average of the output variable to be regulated remains independent of its temporal form, that is to say independent of a waveform or independent of its general presence, for example.

The entire regulating means, that is to say the regulating operational amplifier or regulating amplifier, its negative feedback network and its two inputs together with series impedances and the DC current-blocking high-pass filter, or a part thereof, may also be integrated in an ASIC or FPGA or may be implemented digitally, that is to say integrated in the program for a microcontroller or for a control or regulating IC for the electronic power converter in question.

At least one regulating circuit of this type, provided for the purpose of regulating a clocked electronic power converter, is advantageously contained together with the power converter in an operating device for light-emitting diodes, wherein this can be supplied with the necessary electrical power and operated according to the above method.

A lighting device or lighting system intended for the use of light-emitting diodes is particularly advantageously equipped with at least one such operating device for light-emitting diodes.

Non-limiting embodiments are found in the dependent claims and the entire disclosure, wherein a distinction is not always specifically made between apparatus and use aspects in the description; in any case, the disclosure should be implicitly read with regard to all categories of claims.

BRIEF DESCRIPTION OF THE DRAWINGS

Further advantages, features and details emerge from the following description of exemplary embodiments and from the drawings in which identical or functionally identical elements are provided with identical reference signs and in which.

DETAILED DESCRIPTION

Figure 1:
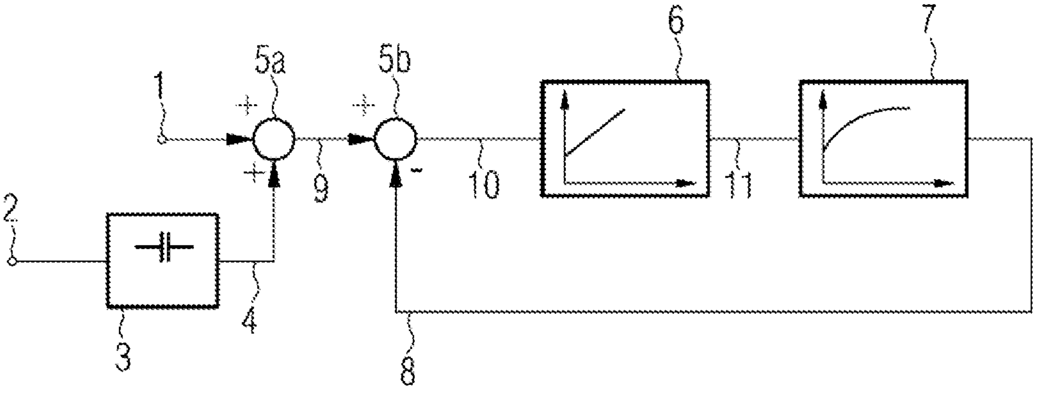
FIG. 1 shows a general structure of a control loop.

FIG. 1 shows the general structure of a control loop, as is implemented in an examined exemplary embodiment for the stated regulating method. In this case, block 6 denotes the actual regulator which uses a voltage signal 10 for the system deviation to form a voltage 11 as a manipulated variable for a section which is intended to be regulated by means of the control loop in question. Block 6 illustrates the step response of the regulator represented thereby, which response has a proportional component and an integrating component. Regulator 6 is therefore a PI regulator, from which it is clear that its negative feedback or compensation is likewise included in block 6. PI negative feedback consists at least of a series circuit comprising a non-reactive resistor for the proportional component and a capacitor for the integrating component of the regulating gain. An operational amplifier with approximately infinite gain and speed forms the active part of the regulator 6, with the result that the gain of the overall regulator 6 is determined as it were solely by the negative feedback. On account of the integrating component in this gain, regulator 6 can permanently implement different voltage levels of the system deviation 10 and the manipulated variable 11, in particular can nevertheless output a manipulated variable 11 that is not equal to zero without a system deviation 10, wherein the difference between the voltage levels is stored in the capacitor of the negative feedback. Each PI regulator can adjust so-called "remaining or static system deviations" which arise whenever a section 7 to be regulated requires a manipulated variable 11 of greater than zero in order to generate a desired output variable which is substantially proportional to the manipulated variable.

Such a section 7, comprising a clocked electronic power converter including its electrical load, a clock generator which generates a pulse pattern on the basis of the manipulated variable 11 input to it, and a control circuit for the gate or for the base of the at least one power transistor of the clocked converter (all of this is not described here and below) which amplifies the pulse pattern such that the respective power transistor can thus be reliably operated in a clocked manner, is represented by a block 7 which depicts a step response having a low-pass-filtering or $PT_1$-filtering behavior. This is because any section of this type has a certain inertia until a change in the manipulated variable 11 entails a corresponding change in the output power 8 of the clocked electronic power converter, for example. Most sections of this type are globally linear, that is to say the level of the change in an output power 8 is proportional to the level of the change in the manipulated variable 11 in wide ranges. Therefore, it is permissible not to discuss the details of this section here and below. Each $PT_1$ section 7 can be satisfactorily stabilized by means of a PI regulator 6.

Purely numerical reference signs, for example 10 or 11, may equally describe, above and in the entire text below, voltages, their associated voltage time profiles or their associated electrical connections, paths, lines or nodes. In addition, the same reference signs also describe the functions of the voltages or lines, with the result that the combination can result only from the function and the associated reference sign, for example "manipulated variable 11". Since it is clear from the context which aspect is meant in each case, splitting of the reference signs according to these aspects does not make any sense. Voltages and voltage time profiles are each based on a common circuit ground. "Manipulated variable 11" is therefore a voltage on a line or a node 11 with respect to the circuit ground with a function of a manipulated variable which can vary over time and can be represented as a time profile over a time axis as an x axis, also accordingly numbered 11.

The signal distinguishing each control loop is the measurement voltage 8. In the exemplary embodiment examined, it corresponds to the output current of the power converter, which current flows through the electrical load. Since the electrical load in the exemplary embodiment examined is a series circuit comprising a plurality of light-emitting diodes intended for general lighting technology or at least one light-emitting diode of this type, its voltage is constant and permanently impressed. Therefore, the output current at the same time represents an output power, and a relative change in the output current entails precisely such a change in the output power. Since global linearity also applies here, the following text—because more generally owing to its relevance to all types of passive electrical loads—usually refers to an output power as the output variable in question even if the output current is always measured in voltage 8.

At a subtraction point 5*b*, the measurement voltage 8 is subtracted from a target value voltage 9. The result is the system deviation 10 which, as soon as it is not equal to zero, causes the regulator 6 to change its manipulated variable 11.

The special feature of the stated solution is that target value 9 may be composed of two components which are added together at a summation point 5*a*. An input of a continuous target value voltage 1, which is also actually constant in the short-term range, that is to say in divisions of one millisecond for example, that is to say which changes only slowly, is obligatory for the functioning of the control loop. A target value voltage 2 for a periodic waveform, for example for a pulse pattern, can be added to the continuous target value 1 at point 5*a*. A further special feature is that target value 2 is always fed in purely capacitively, that is to say via a high-pass filter 3 containing a series capacitor, with which no other element, apart from a further capacitor, can be connected in parallel. In this manner, the average of the sum target value 9 does not differ from the value of the continuous target value 1, even though the form of the sum target value 9 changes drastically, precisely in a similar manner to the undulating target value 2, provided that this is actually input. Irrespective of this, the average of the target value 9 always corresponds to the continuous target value 1. Target value 2 is therefore optional and dominant at the same time since, as soon as it is input, the form of the sum target value 9 changes. The average of the undulating target value 2 in turn advantageously resembles the continuous target value 1, but may also assume other values.

The overall system can produce a measurement voltage 8, which corresponds substantially to the undulating sum target value 9, and therefore also an accordingly corresponding undulating output power, of which measurement voltage 8 is the representation. Only components of the section inertia cannot be adjusted and remain as brief and periodically alternatingly directed system deviations (not illustrated).

Figure 2:
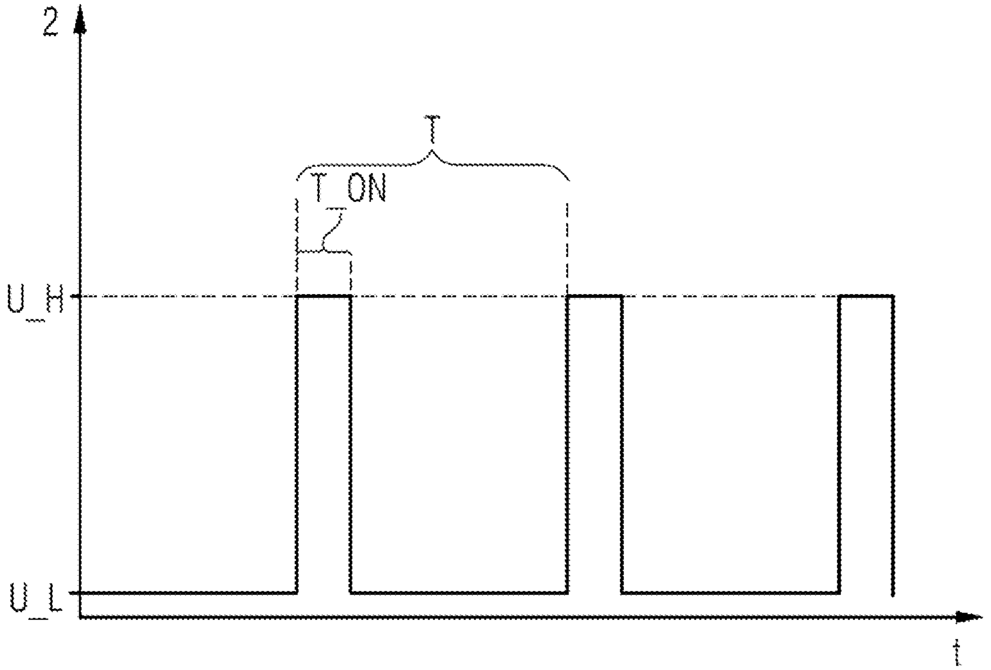
FIG. 2 shows a possible waveform for the voltage of a modification signal.

FIG. 2 describes a possible undulating voltage profile of the target value 2. This voltage oscillates between the values U_H and U_L, wherein there is a period duration T and a pulse duration T_ON. During the pulse duration T_ON, the target value 2 is respectively at a voltage or a higher level U_H and in between is at a voltage U_L which is also denoted with a lower level or simmer level of the target value 2.

Figure 3:
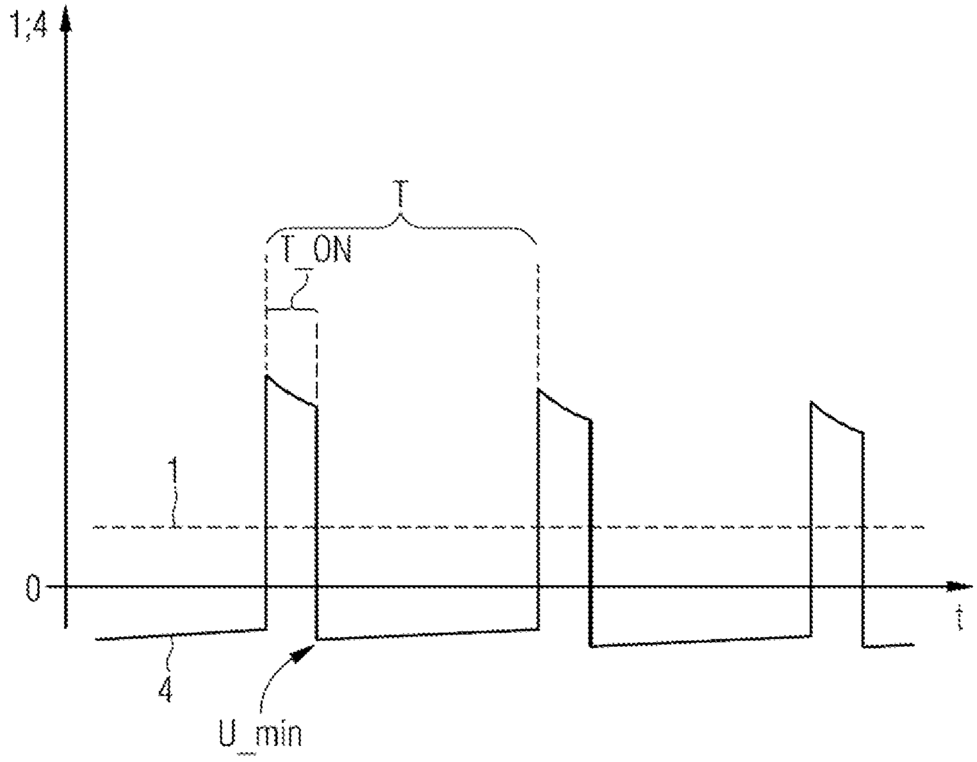
FIG. 3 shows a high-pass-filtered modification signal and a matching voltage as a target value for an average.

The effect of the high-pass filter 3 can be seen in FIG. 3 on the basis of the voltage profile 4. Target value 2 does not have its DC component or average, and the voltage sections which are still horizontal at the top in the target value 2 at values of U_H and U_L are modified into sections of the beginnings of e-functions which all strive toward zero. Only the timing remains unchanged, which is typical of high-pass filters. The high values in the profile 4 occur during T_ON, and the low values in between occur within the remaining durations of the periods T.

The continuous target value 1 is additionally depicted here. So that target value 9 never becomes negative, the reason for which shall also be explained below, the continuous target value 1 must be higher than the magnitude of the voltage U_min which occurs directly after each falling edge of the undulating target value 2.

Figure 4:
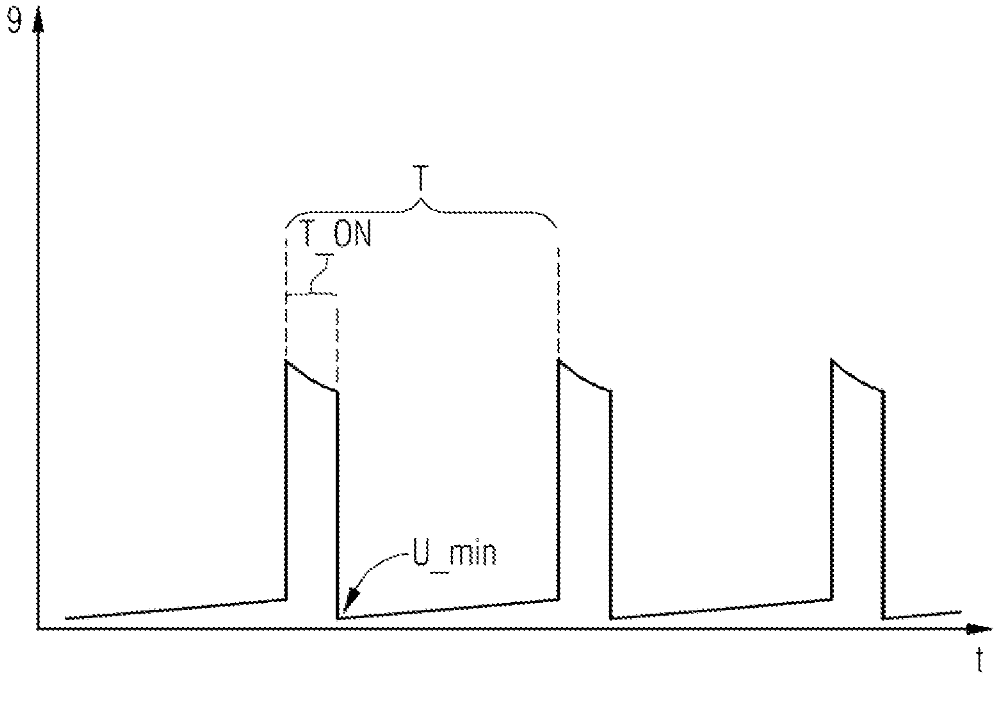
FIG. 4 shows a possible voltage waveform for a target value.

FIG. 4 illustrates the always positive target value 9 which corresponds to the sum of the continuous target value 1 and voltage profile 4, the latter resulting from the high-pass filtering of the undulating target value 2. Target value 9 is fed into the regulating means which forces a section regulated thereby to generate an output power which resembles the target value 9 as well as possible.

Figure 5:
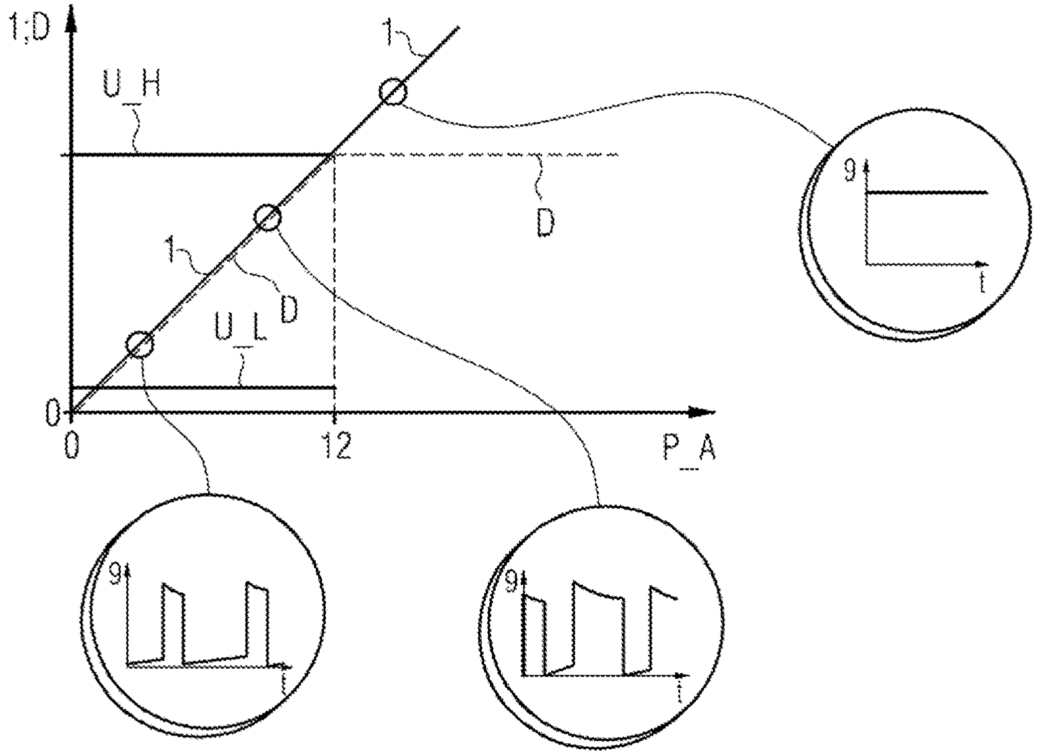
FIG. 5 shows a first embodiment of the regulating method.

FIG. 5 illustrates a first embodiment of the method for the stated regulation, which method is based on the exemplary embodiment examined. In this case, only a continuous target value 1 is applied to the regulator to the right of a first interface 12, which continuous target value results in a proportionally increasing or decreasing output power P_A as soon as target value 1 increases or decreases. In this first region, an undulating target value 2 is either constantly zero or another constant voltage, or the target value input 2 is left open. This results in a continuous sum target value 9, as indicated in the magnified illustration at the top right.

To the left of the first interface 12 appear the voltage levels U_H and U_L which are already known from FIG. 2 and may always be contained only in an undulating target value 2 which is now connected in this left-hand region. In this case, the higher voltage level U_H particularly advantageously corresponds to the value of the continuous target 1 precisely at the interface 12. The lower voltage level U_L is the simmer level of the target value 2. In order to be able to nevertheless vary the output power P_A, the form of the target value 2 must change between these two limit levels U_H and U_L. The simplest change in form, as illustrated here on the basis of a bisecting section of a dashed line, is the change in a duty ratio D in a manner proportional to the desired change in the output power P_A. In this case, D corresponds to the ratio of T_ON, during which the higher level U_H is applied, as shown in FIG. 2, to the period duration T, after which there is next a changeover from the lower to the higher level, which therefore extends between two rising edges of the undulating target value 2. The resulting average output power P_A is therefore smaller, the shorter the T_ON periods in comparison with the period duration T, which is illustrated on the basis of the two magnified illustrations at the bottom in the center and on the left. The target value profiles 9 resulting from the respective points of the method are illustrated there.

In this second region, the continuous target value 1 must be parallel with the value for D so that, according to the description of FIG. 1, a decreasing average output power P_A can actually be produced. The duty ratio for the first region corresponds to that at the interface 12 at which the pulse pattern virtually disappears. D is therefore at a constant 100% there, as can be seen from the horizontal section of the dashed line.

As already mentioned, the entire second region is optional and applies in the described form only when the output power P_A is intended to be produced in a waveform or pulse form, that is to say when an accordingly undulating target value 2 is actually input. Without this value, the value for D would also remain constant at 100% to the left of the interface 12, U_H and U_L would not appear, and the output power P_A would be continuous (all described in the subjunctive, not illustrated) and would change in a manner proportional to the target value 1. This would be the normal case for all resistive or other linear electrical loads and is also the most frequent case for light-emitting diodes as the load since the effort needed to generate an undulating target value 2 would then be saved. At the same time, there is a possibility for a modular design, wherein a basic module comprises the control loop, the high-pass filter 3 and the obligatory input of a continuous target value 1, and wherein an optional additional module, the output of which is to be connected to the high-pass filter which has already been prepared, generates an undulating target value 2.

If light-emitting diodes which are intended for general lighting technology are specifically intended to be dimmed to a very low level, that is to say continuously down to absolute darkness for example, or conversely continuously up from absolute darkness, a waveform or pulse form of the output current, represented in the measurement voltage 8, or of the output power P_A in the left-hand region just outlined is even desirable. This is because light installations having a large number of light-emitting diodes which are connected in series and are therefore operated with the same current are provided with a coarse appearance if the same current is dimmed down to a very great extent and would be absolutely smooth in this case. The reason is defects in the LED crystal that impress an individual minimum current on each individual light-emitting diode, which minimum current is certainly still positive and, when undershot, the light-emitting diode affected becomes absolutely dark for the first time. Some light-emitting diodes do this first, while another light-emitting diode is perhaps the only one to emit light until the end.

The optical appearance of a light installation equipped with a large number of light-emitting diodes and operated in this manner suffers considerably from this. As a result of a waveform of the light-emitting diode current at these low brightnesses, all light-emitting diodes involved in the same light installation emit light of approximately the same brightness, but in a micro-pulsed manner as it were, and further dimming takes place, as known, by reducing a duty ratio which is smoothed by the eye into a continuously reducing brightness. There is also a positive glitter effect since, at very low brightnesses, the human eye is accustomed to the light sources flickering slightly, like the natural night sky, for example.

At very low brightnesses of light-emitting diodes, the stated method allows their light to be controlled directly via the duty ratio D. The certainly still positive minimum current, below which a light-emitting diode is absolutely dark, is included in the simmer level which is represented by the lower voltage level U_L in the undulating target value 2. For reasons of speed, accuracy and avoidance of mode changes, it is considerably advantageous, instead of completely turning off each time between the individual pulses of the duration T_ON, to respectively allow a small current to continue to flow through the light-emitting diodes, which current is smaller than the above minimum current and is represented by the simmer level U_L in the undulating target value 2 and therefore simultaneous positive values of the sum target value 9. As the quintessence thereof, the continuous target value 1 for the average output power can be increased by up to this simmer level, the closer the desired brightness is intended to be to absolute darkness.

Figure 6:
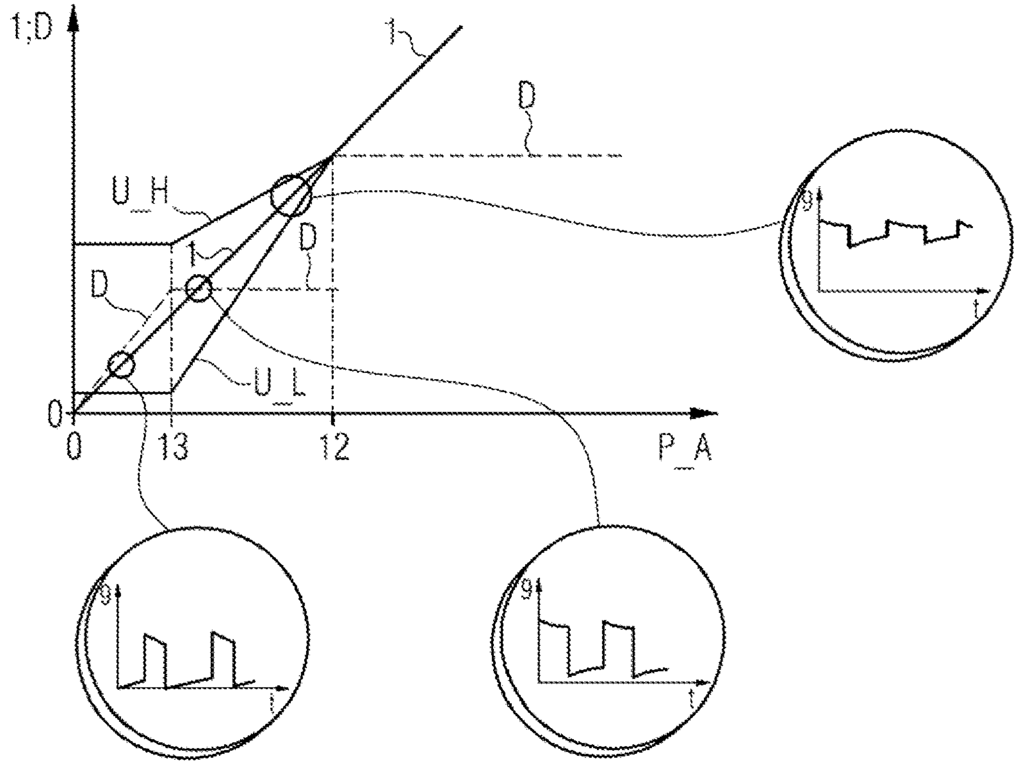
FIG. 6 shows a second embodiment of the regulating method.

FIG. 6 shows a possible modification and expansion as a second embodiment of the stated method, for which the last two sections of the description—waveform additional module, direct light control by means of waveform—likewise apply. However, as a distinction, there is a second interface 13. To the left of the latter is a second region which can be described similarly to that above, only with the first difference that, in particular, the higher voltage level U_H is reduced in comparison with the second region in the preceding figure, and with the resultant second difference that the duty ratio D starts at a higher value than "suggested" by the continuous target value 1 at the interface 13 for the average output power P_A, and accordingly decreases more steeply during reduction of P_A.

A third region which is characterized by a constant duty ratio D=½ is produced between the first interface 12, which bounds the first region, as is already known without change from above, and the second interface 13. A power reduction is achieved here by the levels of U_H and U_L for the undulating target value—both beginning at the value of the continuous target value 1 at interface 12—decreasing linearly, wherein the distance between the higher level U_H and a target value 1 is in each case equal to the distance between the lower level U_L and the same target value 1, only in different directions. This results in the above characteristic duty ratio which needs to be kept constant in this exemplary third region. This third region is useful, in particular, for reducing a color change of a light-emitting diode which is intended to be dimmed over a wide range.

Figure 7:
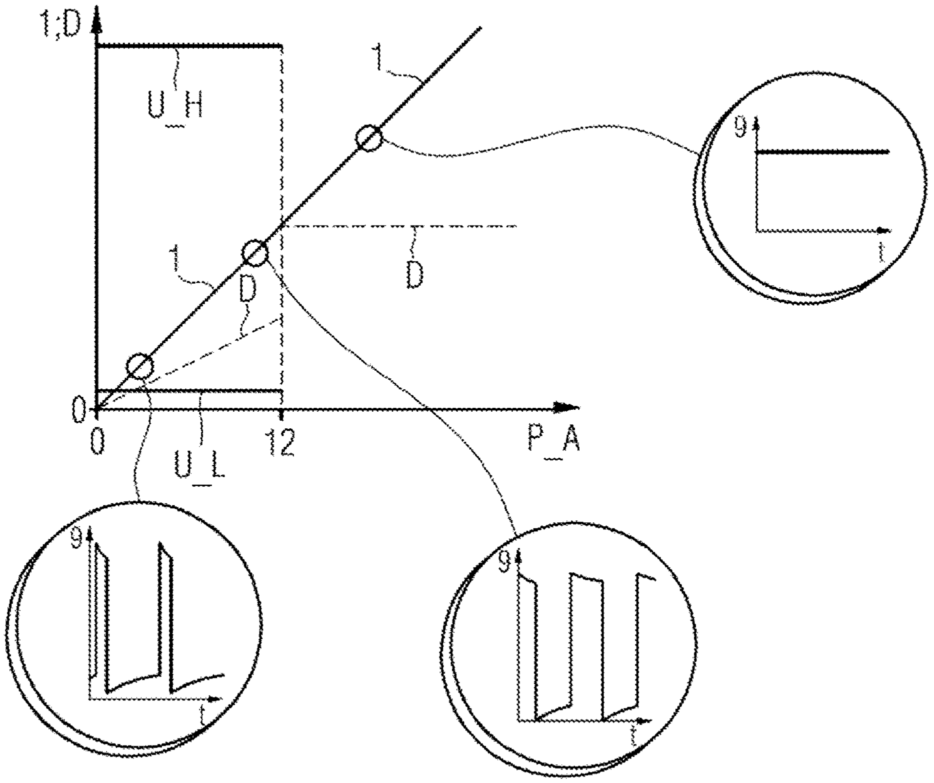
FIG. 7 shows a third embodiment of the regulating method.

FIG. 7 combines some features of the forms of the two preceding figures to form a third embodiment of the stated method. The only two regions and the only one interface 12 come from FIG. 5. The first region from the two preceding figures is likewise adopted without change. The duty ratio D=½ comes from FIG. 6 and, like there, is intended to apply on that side of the interface 12 which points to the left of the second region. The aim of this duty ratio is to arrive immediately at the maximum ripple of the waveform, in particular the pulse form, upon entering the second region from the first region. So that the lower level can also immediately drop to the simmer level U_L on the same side of the interface 12, the higher level U_H must be at least twice as high as the level of the continuous target value 1 at the interface 12 in order to compensate for the duty ratio D which has been abruptly reduced to ½. Otherwise, the second region here corresponds to that from FIG. 5, save that the higher level here is precisely twice as high as there, and that the duty ratio D, although likewise decreasing linearly to zero here as there, is only half as large here as there in each case.

Figure 8:
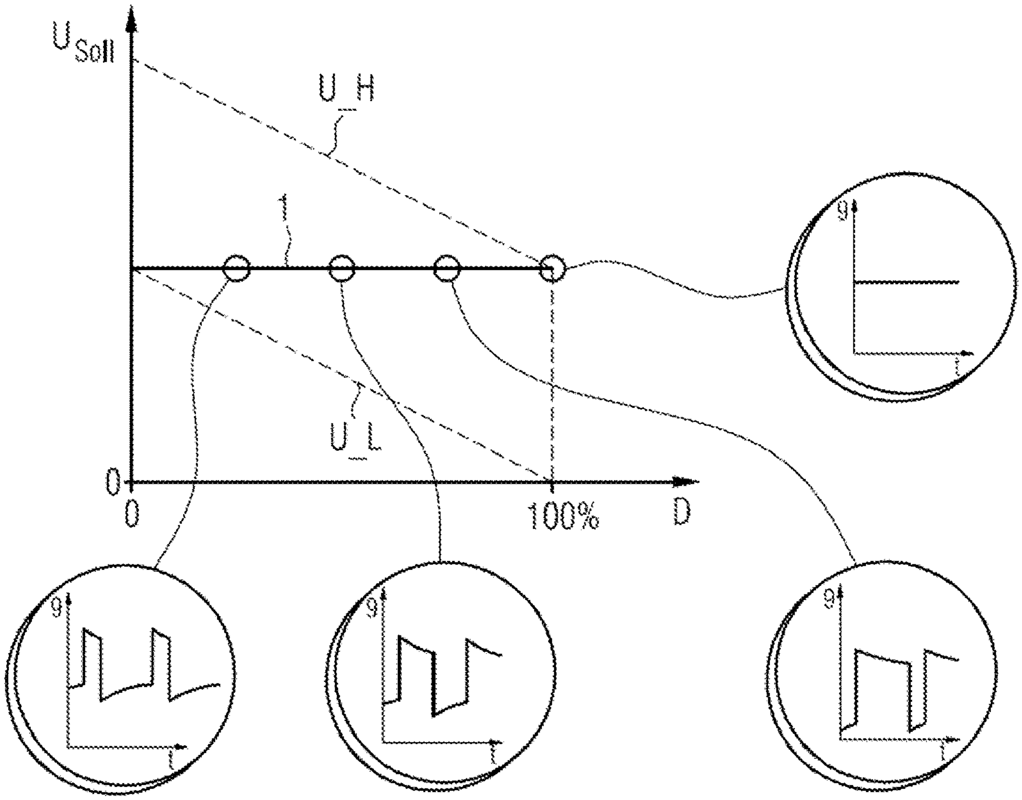
FIG. 8 shows a relationship between a duty ratio, an average, an upper target value level and a lower target value level.

FIG. 8 shows the relationship between the duty ratio D, higher target value level U_H and lower target value level U_L. In contrast to the three figures before, the desired average is the same in each case here, as is the average output power P_A, which is why it is omitted as an x axis variable here. The continuous target value 1 has also become a horizontal straight line. The duty ratio D, the 100% point of which contains all first interfaces 12 above, appears here on the x axis. The intention is to show that different duty ratios D can nevertheless be used to produce an identical average output power even though their forms—as desired—differ greatly from one another. Some of the levels U_H and U_L required for this are also shown.

In this case, the pulse frequency, that is to say the T from FIGS. 2 to 4, and the edge height, that is to say the difference between U_H and U_L, are intended to remain constant. The latter is illustrated in the constant distance between the lines for U_H and U_L. The former is clear from the three left-hand magnified illustrations, in which the rising edges of the sum target value 9 are each at the same distance from one another. These boundary conditions result in levels for U_H and U_L which each increase linearly to a greater extent, the more the duty ratio D decreases linearly. Other boundary conditions, for example "same degree of modulation over all duty ratios" or "area equality of the half-pulses with respect to the average", would result in other level profiles for U_H and U_L, which are not illustrated.

Figure 9:
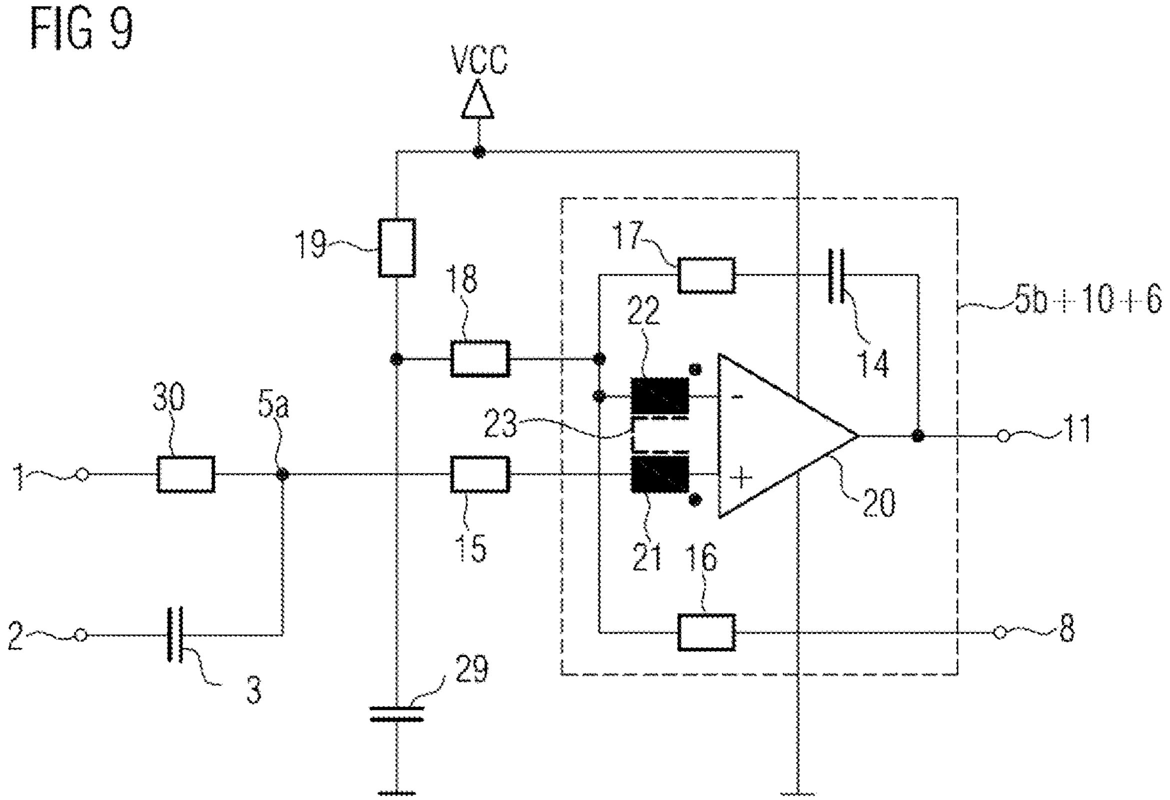
FIG. 9 shows a first possible associated circuit.

FIG. 9 illustrates a possible circuit for a regulator which can be used to carry out the stated method. An operational amplifier 20 as the only active part of the regulator is surrounded by its negative feedback which, as already indicated, comprises a series circuit comprising an integrating capacitor 14 with a negative feedback resistor 17. The operational amplifier 20 is supplied by an internal auxiliary voltage VCC and is based on the circuit ground, on which the auxiliary voltage is likewise based. At its output, to which the integrating capacitor 14 is also connected, the manipulated variable 11 is output in the form of a voltage and is used to control the section—here a clocked electronic power converter having at least one light-emitting diode as a load—which is intended to be controlled and stabilized by the regulator illustrated. The measurement voltage 8—here representative of the output current and, owing to the LED load, representative of the output power at the same time—is coupled via a feedback resistor 16 to the negative regulating input of the operational amplifier 20, to which the negative feedback resistor 17 is likewise coupled. The feedback resistor 16 corresponds to the second series impedance generally introduced above. The sum target value is coupled to the positive regulating input of the same operational amplifier 20 via an input resistor 15 which corresponds to the above generally introduced first series impedance. A small inductance 21 is connected directly in series between the input resistor 15 and the positive regulating input of the amplifier 20, which inductance may be a ferrite bead inductor and is used to block very high-frequency interference signals which may come from mobile telephony, for example. An identical small inductance 22 is also connected between the negative regulating input of the amplifier 20 and the point which is used to connect the negative feedback resistor 17 and feedback resistor 16 to one another. Optionally and for even more effective blocking of high-frequency interference, the two identical inductances 21 and 22 may also be coupled by means of a common bead 23 in such a manner that a common-mode choke is produced in the viewing direction of the two regulating inputs of the amplifier 20. Figuratively speaking, both input lines for the amplifier 20 then leave the bead 23 on its same end face. The dashed small box with the reference sign 5*b*+10+6 illustrates which elements from FIG. 1 are included in this small box. In particular, the subtraction point 5*b* and the system deviation 10 cannot be represented discretely since both take place inside the operational amplifier 20.

The continuous target value 1 can be output as a voltage to a series resistor 30, the other end of which is connected to a summation point 5*a*, the voltage of which corresponds to the sum target value, and which is therefore also connected to the input resistor 15. A high-pass capacitor 3 is likewise connected, as the simplest representative of the high-pass filter 3, to the summation point 5*a*, to which capacitor the undulating target value 2 can be input either directly or via a second series resistor (not illustrated), if precisely an accordingly undulating output power is desired. If a continuous output power is desired, the high-pass capacitor 3 remains open. Since, as a matter of principle, no significant current whatsoever flows into an input of an operational amplifier, neither series resistor 30 nor input resistor 15 contributes to the regulating gain. In contrast, series resistor 30 completes the high-pass filter for the undulating target value 2 since a current caused by it can flow through the high-pass capacitor 3, via the series resistor 30, back into the voltage source for the continuous target value 1.

The proportional regulating gain, that is to say a fast voltage change at the output of the amplifier 20 based on precisely such a change at its positive regulating input, is defined by the ratio of the sum of feedback resistor 16 and negative feedback resistor 17 to the feedback resistor 16.

This is because such a current can flow, from the low-impedance output of the amplifier 20, on the path of the negative feedback and the feedback, into the measuring apparatus which likewise has a low impedance and is connected to point 8, which current is proportional to fast voltage changes in the manipulated variable 11.

The integrating regulating gain in the case of a static system deviation, that is to say the slope of the manipulated variable 11 for a constant measurement voltage 8 and a simultaneously constant difference in the voltage of the positive regulating input, corresponds to the level of the system deviation divided by the product of feedback resistor 16 and integrating capacitor 14, which product simultaneously defines the time constant of the PI regulator in question.

The meaning of the feedback resistor 16 becomes clear from the two regulating gains. The lower its impedance is selected to be, the more strongly and simultaneously more quickly the associated PI regulator reacts. If it were not present and were replaced with a direct connection, the regulator would degenerate into a comparator despite its negative feedback. If both gains are intended to be throttled at the same time, that is to say the PI regulator is intended to react more weakly and at the same time more slowly to target value changes, the feedback resistor should simply be selected to have a higher impedance. Therefore, the feedback resistor 16 is included in the dashed small box 5*b*+10+6 which is intended to describe a complete PI regulator. In contrast, the ratio between proportional and integrating regulating gain is determined by the size ratio of the integrating capacitor 14 and the negative feedback resistor 17 with respect to one another. Particularly advantageous dimensions for the exemplary embodiment examined prove to be 100 kiloohms for the negative feedback resistor 17, 22 nanofarads for the integrating capacitor 14, 100 ohms for the feedback resistor 16, 10 kiloohms for the input resistor 15 and for the series resistor 30, and 22 nanofarads for the high-pass capacitor 3.

If the amplifier 20 were supplied in a bipolar manner, that is to say its negative supply were not connected to the circuit ground, but rather to a lower potential, the regulator would hereby already be ready. However, bipolar supplies require duplicate auxiliary voltage circuits and are unpopular in mass production. Therefore, the operational amplifiers are generally supplied by the same single-pole auxiliary voltage VCC as the entire passive wiring around them, which has largely already been explained above. In the case of very small target values—as certainly occurs here for deep dimming of light-emitting diodes—the operational amplifier with all signals at its inputs and outputs reaches the edge of its supply voltage. In this case, the amplifier becomes inaccurate and non-linear, it begins to distort and has a higher level of noise. For the purpose of accurate regulation to the lower edge of the required regulating range, this should be avoided. For this purpose, all signals may be artificially increased in order to move away from the lower edge of the supply voltage of the operational amplifier. Target values may be increased by a constant basic amount or offset, but the reported measurement voltage 8 may also be artificially increased. For this purpose, starting from the internal auxiliary voltage VCC, there is a second branch in the direction of circuit ground that mainly comprises a pull-up resistor 19, a coupling resistor 18, the already known feedback resistor 16 and a very low-impedance current measuring apparatus between point 8 and circuit ground. A filter capacitor 29 is connected between pull-up resistor 19 and coupling resistor 18, the other end of which filter capacitor is likewise connected to circuit ground. The increase in the voltage at the negative input of the amplifier 20, which is caused by all of this, does not play any role in the regulating accuracy since this increase remains stored as an additional voltage in the integrating capacitor 14. Only the continuous target value 1 must be increased by an appropriate base. Particularly advantageous dimensions for the second branch are 47 kiloohms for the pull-up resistor 19, 10 nanofarads for the filter capacitor 29, and 15 kiloohms for the coupling resistor 18. The latter and the filter capacitor 29 act as a low-pass filter for the negative feedback and feedback equally, with the result that it needs to be taken into account when determining the regulating gain and time constant.

Figure 10:
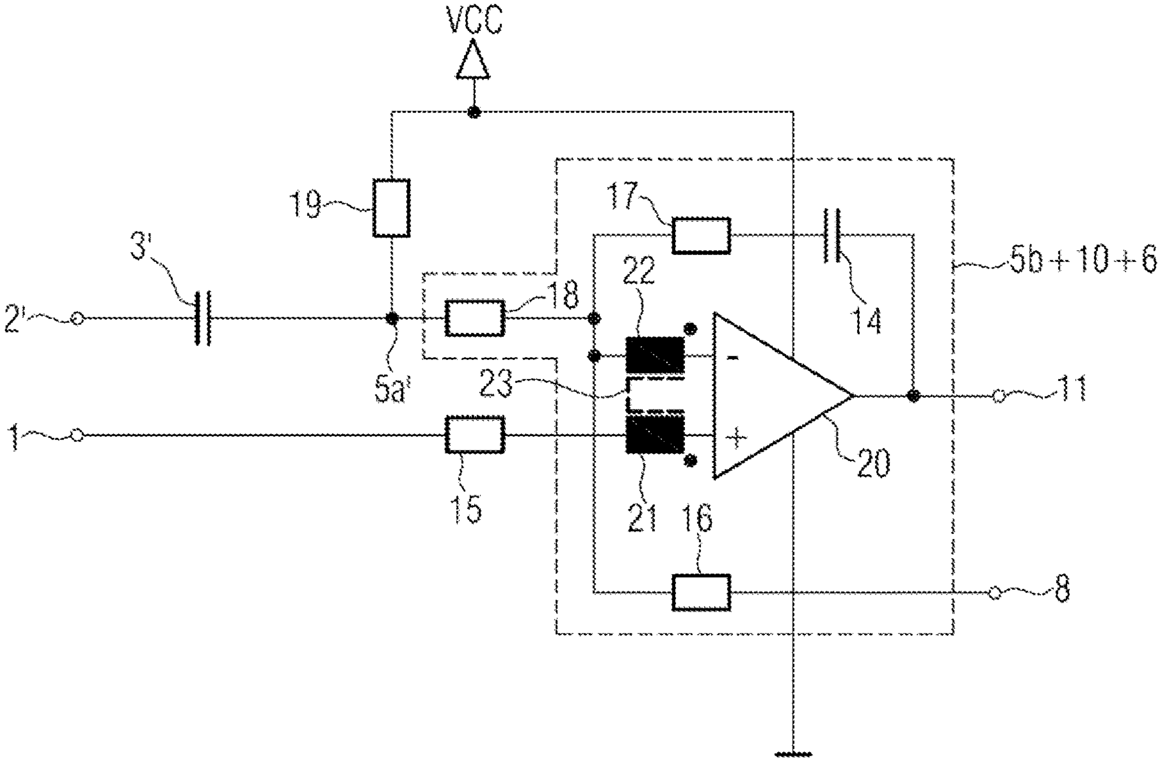
FIG. 10 shows a second possible associated circuit.

FIG. 10 finally emerges from the preceding figure if the undulating target value 2' is inverted or is intended to modify the at least one undulating desired output variable in an inverted manner. The target value 2' can then be particularly advantageously easily led to the negative regulating input of the amplifier 20. This dispenses with the summation point 5*a* and, with it, also the series resistor 30. Only the input resistor 15 remains as the outer wiring for the continuous target value 1. The high-pass capacitor 3' which is also obligatory here is now particularly advantageously connected precisely to that node 5*a'* to which the filter capacitor 29 was connected above and is dispensed with here. In a similar manner to the low-impedance measurement voltage 8 across the very important feedback resistor 16, the undulating target value 2' must also be connected to the negative regulating input of the amplifier 20 via a series impedance. This task is now undertaken now by the coupling resistor 18, the value of which can change with respect to above as a result, and which causes regulating gains for the undulating target value 2' which can differ from those described above. Instead of the omitted series resistor 30, the pull-up resistor 19 here completes the high-pass filter for the undulating target value 2'.

LIST OF REFERENCE SIGNS

- 1 Continuous target value, associated voltage, associated input or associated line
- 2 Undulating target value, associated voltage, associated input or associated line, each non-inverted or non-inverting
- 2' Undulating target value, associated voltage, associated input or associated line, each inverted or inverting
- 3 High-pass filter or high-pass capacitor, non-inverting
- 3' High-pass capacitor, inverting
- 4 High-pass-filtered voltage which results from the undulating target value
- 5*a* Summation point, non-inverting
- 5*a'* Summation point, inverting
- 5*b* Subtraction point
- 6 PI regulator
- 7 Linear and linearly delaying section
- 8 Measurement voltage or associated input or output power or output current
- 9 Target value or sum target value
- 10 System deviation
- 11 Output of an operational amplifier or manipulated variable
- 12 First interface
- 13 Second interface
- 14 Integrating capacitor
- 15 Input resistor or first series impedance
- 16 Feedback resistor or second series impedance

17 Negative feedback resistor
18 Coupling resistor
19 Pull-up resistor
20 Operational amplifier
21 Small inductance in series with the positive input of the amplifier 20
22 Small inductance in series with the negative input of the amplifier 20
23 Possible coupling between the inductances 21 and 22
29 Filter capacitor
30 Series resistor

The invention claimed is:

1. A method for regulating a clocked power converter, wherein the power converter comprises:

an input for inputting an input power;
an output for outputting a regulated output power;
a control loop optimized for regulation to a specified continuous output power; and
at least one first and one second input for inputting target values and a regulator;
wherein at least one first target value specifies the value of the continuous output power;
wherein at least one second target value which specifies a waveform can be input; and
wherein a sum of all target values forms, at the inputs, a sum target value which is input to the regulator, wherein the method comprises:

inputting the first target value to the first input;
inputting the second target value with a waveform to the second input;
modifying the second target value by means of a DC current-blocking high-pass filter, with the result that the average of the sum target value corresponds to the value of the first target value;
adding the first target value and the second target value to form said sum target value;
inputting the sum target value to the control loop in order to generate, at the output of the power converter, an output power with a waveform qualitatively equivalent to the second target value;
wherein the average of the output power corresponds to the value of a continuous output power specified by the first target value.

2. The method as claimed in claim 1, wherein the average of the output power remains constant independent of whether the output power is continuous or is modified with a waveform.

3. The method as claimed in claim 1, wherein the input of the second target value for a waveform at the second input is optional, wherein the first target value is input in the form of a continuous voltage, and wherein the second target value can be input in the form of an accordingly undulating voltage.

4. The method as claimed in claim 1, wherein the power converter generates a continuous output power if a second target value for a waveform is not input to the second input.

5. The method as claimed in claim 1, wherein the second target value has temporal minima which differ from the average of its waveform by a magnitude which is smaller than the magnitude of the first target value.

6. The method as claimed in claim 1, wherein the waveform is substantially rectangular, in that the second target value is a target value for the waveform, and in that the edge heights of the regulated output power depend on the edge heights of the second target value.

7. The method as claimed in claim 6, wherein the edge heights of the regulated output power depend on the average of this regulated output power and on a duty ratio of the pulse pattern.

8. The method as claimed in claim 6, wherein the edge heights of the output power to be regulated are constant.

9. The method as claimed in claim 5, wherein the frequency of the waveform or of the pulse pattern ranges from 500 Hz to 10 kHz.

10. The method as claimed in claim 1, wherein the output current of the electronic power converter is regulated using the regulated output power.

11. A circuit arrangement for regulating a clocked power converter which has an input for inputting an input power and an output for outputting a regulated output power, wherein the circuit arrangement comprises:

a control loop optimized for regulation to a specified continuous output power; and
at least one first and one second input for inputting target values and a regulator;
at least one operational amplifier as part of the control loop, having a first, non-inverting input and a second, inverting input, from the output of which a compensation network as part of the control loop runs to one of its inputs, wherein the compensation network has a third input for a measurement signal of an output power to be regulated, wherein the third input forwards the measurement signal to the first or second regulating input via a second series impedance;
wherein the first input is configured to input a signal for a first target value of the average of the output power to be regulated and forwards this signal to one of the inputs of the operational amplifier via a first series impedance;
wherein the second input is configured to input a signal for the second target value of a waveform for the output power to be regulated, wherein the circuit arrangement is configured to forward the signal for the second target value to one of the inputs of the operational amplifier via a DC current-blocking high-pass filter.

12. The circuit arrangement as claimed in claim 11, wherein the circuit arrangement is configured to block an average of the second target value by means of the high-pass filter and to add only the AC component of the second target value to the first target value so that the average of the output power specified by the first target value is not changed by the second target value.

13. The circuit arrangement as claimed in claim 11, wherein the high-pass filter is at least one series capacitor.

14. The circuit arrangement as claimed in claim 11, wherein the second target value is produced in a circuit module which can be coupled to the second input.

15. The circuit arrangement as claimed in claim 11, wherein the negative feedback network comprises at least one integrating capacitor and, in series with the latter, a negative feedback resistor which, together with the second series impedance, results in a proportional gain of the regulating amplifier that is designed for a maximum intended edge height of the desired waveform.

16. The circuit arrangement as claimed in claim 11, wherein the circuit arrangement is completely or partially integrated in an ASIC or FPGA, or in that the circuit arrangement is completely or partially digitally integrated in a program for a microcontroller or for a control or regulating IC for a clocked power converter.

17. An operating device for light-emitting diodes, wherein the operating device comprises:

at least one clocked power converter, and at least one circuit arrangement as claimed in claim 11 for regulating the clocked power converter.

18. A lighting system comprising:

light-emitting diodes; and the operating device as claimed in claim 17.

* * * * *